(12) United States Patent
Pietrzyk et al.

(10) Patent No.: US 11,889,494 B2
(45) Date of Patent: Jan. 30, 2024

(54) COOPERATIVE RADIO RESOURCE SCHEDULING IN A WIRELESS COMMUNICATION NETWORK AND METHODS FOR USE THEREWITH

(71) Applicant: ISRD Sp. z o.o., Piaseczno (PL)

(72) Inventors: Slawomir Pietrzyk, Piaseczno (PL); Md Munjure Mowla, Rajshahi (BD); Adam Flizikowski, Bydgoszcz (PL); Farinaz Kooshki, Piaseczno (PL); Adam Girycki, Zabrze (PL); Jakub Piotr Kocot, Warsaw (PL)

(73) Assignee: ISRD Sp. z o.o., Piaseczno (PL)

( * ) Notice: Subject to any disclaimer, the term of this patent is extended or adjusted under 35 U.S.C. 154(b) by 223 days.

(21) Appl. No.: 17/645,917

(22) Filed: Dec. 23, 2021

(65) Prior Publication Data

US 2022/0210794 A1 Jun. 30, 2022

Related U.S. Application Data

(60) Provisional application No. 63/264,472, filed on Nov. 23, 2021, provisional application No. 63/260,009, (Continued)

(51) Int. Cl.
*H04W 72/121* (2023.01)
*H04W 28/16* (2009.01)
*H04W 72/50* (2023.01)

(52) U.S. Cl.
CPC ......... *H04W 72/121* (2013.01); *H04W 28/16* (2013.01); *H04W 72/535* (2023.01)

(58) Field of Classification Search
CPC ............................ H04W 28/16; H04W 72/535
See application file for complete search history.

(56) References Cited

U.S. PATENT DOCUMENTS 9,763,282 B2 9/2017 Pelletier
9,854,597 B2 12/2017 Chen
(Continued)

FOREIGN PATENT DOCUMENTS

CN 102752765 A 10/2012
CN 102804831 11/2012
(Continued)

OTHER PUBLICATIONS

A. Khalili, S. Akhlaghi, H. Tabassum and D. W. K. Ng, "Joint User Association and Resource Allocation in the Uplink of Heterogeneous Networks," in IEEE Wireless Communications Letters. doi: 10.1109/LWC.2020.2970696.
(Continued)

*Primary Examiner* — Ajay Cattungal
(74) *Attorney, Agent, or Firm* — Garlick & Markison; Bruce E. Stuckman

(57) ABSTRACT

A radio network operates by: converting, in accordance with a communication standard, received fronthaul communications from a plurality of radio units (RUs) into backhaul communications transmitted to a communications network, wherein the plurality of radio units are configured to engage in wireless communications with a plurality of user equipment (UEs) via a radio channel of a radio network; converting, in accordance with the communication standard, received backhaul communications from the communications network into fronthaul communications transmitted to the plurality of RUs; providing a shared scheduler associated with a radio channel that is partitioned into a plurality of physical radio blocks (PRBs), wherein the plurality of PRBs are accessible by the plurality of UEs via the RUs; and generating, via the shared scheduler, an UE to PRB to RU allocation that associates ones of the plurality of PRBs to selected ones of the plurality of UEs and selected ones of the
(Continued)

US 11,889,494 B2

Page 2 plurality of RUs, without a UE to RU pre-allocation, wherein the fronthaul communications control wireless communications between the plurality of UEs and the plurality of RUs, via the UE to PRB to RU allocation.

18 Claims, 10 Drawing Sheets

Related U.S. Application Data filed on Aug. 6, 2021, provisional application No. 63/217,508, filed on Jul. 1, 2021, provisional application No. 63/213,496, filed on Jun. 22, 2021, provisional application No. 63/131,607, filed on Dec. 29, 2020.

(56) References Cited

U.S. PATENT DOCUMENTS

| | | | |
|---|---|---|---|
| 9,893,774 B2 | 2/2018 | Shattil | |
| 9,918,325 B2 | 3/2018 | Nguyen | |
| 10,440,693 B2 | 10/2019 | Ghosh | |
| 10,779,286 B2 | 9/2020 | Beattie, Jr. | |
| 2014/0315561 A1 | 10/2014 | Hooli et al. | |
| 2016/0113018 A1 | 4/2016 | Li | |
| 2016/0234819 A1* | 8/2016 | da Silva | H04L 41/5054 |
| 2016/0242147 A1* | 8/2016 | Tarlazzi | H04W 88/085 |
| 2016/0315754 A1* | 10/2016 | Wu | H04L 5/0062 |
| 2017/0099658 A1 | 4/2017 | Shattil | |
| 2017/0126853 A1* | 5/2017 | Goel | H04L 67/60 |
| 2017/0127409 A1 | 5/2017 | Mishra | |
| 2017/0202006 A1 | 7/2017 | Rao | |
| 2017/0331577 A1* | 11/2017 | Parkvall | H04J 11/0079 |
| 2017/0331670 A1* | 11/2017 | Parkvall | H04L 41/0816 |
| 2018/0234875 A1* | 8/2018 | Leroudier | H04W 24/00 |
| 2019/0090247 A1 | 3/2019 | Qvarfordt | |
| 2019/0124522 A1 | 4/2019 | Cao | |
| 2019/0274064 A1* | 9/2019 | Chapman | H04W 72/52 |
| 2020/0128414 A1* | 4/2020 | Mishra | H04W 72/542 |
| 2020/0137594 A1 | 4/2020 | Notargiacomo | |
| 2020/0169301 A1* | 5/2020 | Hong | H04B 7/0695 |
| 2020/0252847 A1 | 8/2020 | Park | |
| 2020/0280863 A1 | 9/2020 | Cioffi | |
| 2020/0304362 A1 | 9/2020 | Palenius | |
| 2020/0366341 A1 | 11/2020 | Lin | |
| 2021/0126726 A1 | 4/2021 | Parkvall | |
| 2021/0314975 A1 | 10/2021 | Barabell | |
| 2021/0399854 A1 | 12/2021 | Carnero | |
| 2023/0291450 A1* | 9/2023 | Su | H04L 5/0051 370/329 |

FOREIGN PATENT DOCUMENTS

| | | |
|---|---|---|
| CN | 103404197 | 11/2013 |
| EP | 2849524 | 3/2017 |
| EP | 3531775 | 8/2019 |
| KR | 1020090044008 A | 5/2009 |
| KR | 101101722 | 1/2012 |
| KR | 20160028970 | 3/2016 |

OTHER PUBLICATIONS

Gerasimenko, et al.; Cooperative Radio Resource Management in Heterogeneous Cloud Radio Access Networks. IEEE Access; Apr. 13, 2015; vol. 3; pp. 397-406.

H. U. Sokun, E. Bedeer, R. H. Gohary and H. Yanikomeroglu, "Fairness-oriented resource allocation for energy efficiency optimization in uplink OFDMA networks," 2018 IEEE Wireless Communications and Networking Conference (WCNC), Barcelona, 2018, pp. 1-6.

Hoang, T.D. and Le, L.B., 2017. Joint prioritized scheduling and resource allocation for OFDMA-based wireless networks. IEEE Transactions on Wireless Communications, 17(1), pp. 310-323.

International Searching Authority; International Search Report and Written Opinion; International Application No. PCT/US2021/072609; dated Mar. 15, 2022; 8 pgs.

Le, N.T., Tran, L.N., Vu, Q.D. and Jayalath, D., 2019. Energy-efficient resource allocation for OFDMA heterogeneous networks. IEEE Transactions on Communications, 67(10), pp. 7043-7057.

Mehboob et al.; Genetic Algorithms in Wireless Networking: Techniques, Applications, and Issues; arXiv:1411.5323v1 [cs.NI]; Nov. 2014; 27 pgs.

Rahman, M.A.; Lee, Y.; Koo, I. Energy-Efficient Power Allocation and Relay Selection Schemes for Relay-Assisted D2D Communications in 5G Wireless Networks. Sensors 2018, 18, 2865.

Rahman, M.A.; Lee, Y.; Koo, I. Joint Relay Selection and Power Allocation through a Genetic Algorithm for Secure Cooperative Cognitive Radio Networks. Sensors 2018, 18, 3934.

S. Pietrzyk and G. J. M. Janssen, "Cooperative Intra-cell Spectrum Reuse Method for OFDMA-based Multiple Access Systems," 2006 International Conference on Microwaves, Radar & Wireless Communications, Krakow, 2006, pp. 630-633, doi: 10.1109/MIKON. 2006.4345258.

S. Pietrzyk and G. J. M. Janssen, "Multiuser subcarrier allocation for QoS provision in the OFDMA systems," Proceedings IEEE 56th Vehicular Technology Conference, Vancouver, BC, Canada, 2002, pp. 1077-1081 vol. 2, doi: 10.1109/VETECF.2002.1040769.

S. Pietrzyk, "OFDMA for Broadband Wireless Access," Artech House, 2006—250.

Sultan, R., Song, L., Seddik, K.G. and Han, Z., 2020. Joint resource management with distributed uplink power control in full-duplex OFDMA networks. IEEE Transactions on Vehicular Technology, 69(3), pp. 2850-2863.

W. K. Lai and J. Liu, "Cell Selection and Resource Allocation in LTE-Advanced Heterogeneous Networks," in IEEE Access, vol. 6, pp. 72978-72991, 2018.

Y. Liu, X. Yang, I. C. Wong, Y. Wang and L. Cuthbert, "Evaluation of Game Theory for Centralized Resource Allocation in Multi-Cell Network Slicing," 2019 IEEE 30th Annual International Symposium on Personal, Indoor and Mobile Radio Communications (PIMRC), Istanbul, Turkey, 2019, pp. 1-6.

Z. Lin and Y. Liu, "Joint Uplink-Downlink Resource Allocation in OFDMA Cloud Radio Access Networks," 2018 IEEE International Conference on Communications (ICC), Kansas City, MO, 2018, pp. 1-6.

Zhang, X., Chang, T.H., Liu, Y.F., Shen, C. and Zhu, G., 2019. Max-min fairness user scheduling and power allocation in full-duplex OFDMA systems. IEEE Transactions on Wireless Communications, 18(6), pp. 3078-3092.

Zhao, N., Liang, Y.C., Niyato, D., Pei, Y., Wu, M. and Jiang, Y., 2019. Deep reinforcement learning for user association and resource allocation in heterogeneous cellular networks. IEEE Transactions on Wireless Communications, 18(11), pp. 5141-5152.

3GPP; 3rd Generation Partnership Project; Technical Specification Group Radio Access Network; Coordinated multi-point operation for LTE physical layer aspects (Release 11); 3GPP TR 36.819 V11.1.0; Dec. 2011; 69 pages.

3GPP; 3rd Generation Partnership Project; Technical Specification Group Radio Access Network; Coordinated multi-point operation for LTE physical layer aspects (Release 11); 3GPP TR 36.819 V11.1.0; Sep. 2013; 70 pages.

Adamuz-Hinojosa, Oscar, et al. "Sharing gNB components in RAN slicing: A perspective from 3GPP/NFV standards." 2019 IEEE Conference on Standards for Communications and Networking (CSCN). IEEE, 2019.

Alba, Alberto Martinez, et al. "A realistic coordinated scheduling scheme for the next-generation RAN." 2018 IEEE Global Communications Conference (GLOBECOM). IEEE, 2018; 7 pages.

Alba, Alberto Martinez, Jorge Humberto Gómez Velasquez, and Wolfgang Kellerer. "An adaptive functional split in 5G networks." IEEE Infocom 2019-IEEE Conference on Computer Communications Workshops (INFOCOM WKSHPS). IEEE, 2019; 7 pages.

Björnson, et al. "Making cell-free massive MIMO competitive with MMSE processing and centralized implementation." IEEE Transactions on Wireless Communications 19.1 (2019): 77-90.

(56) References Cited

OTHER PUBLICATIONS

Boviz, Dora, et al. "Multi-cell coordination in cloud ran: Architecture and optimization." 2016 International Conference on Wireless Networks and Mobile Communications (WINCOM). IEEE, 2016.
Chen, Zengxian, et al. "Radio resource coordination and scheduling scheme in ultra-dense cloud-based small cell networks." EURASIP Journal on Wireless Communications and Networking 2018.1 (2018): 1-15.
Escudero-Garzas et al.; On the Feasibility of 5G Slice Resource Allocation With Spectral Efficiency: A Probabilistic Characterization; IEEEAccess; Oct. 2019; pp. 151948-151961; vol. 7, 17; DOI: 10.1109/ACCESS.2019.29479 A pp. 151948-151959.
Frank et al.; Cooperative Interference-Aware Joint Scheduling for the 3GPP LTE Uplink; 10.1109/PIMRC.2010.5671678; Oct. 2010; 6 pages.
Gharsallah et al. "SDN/NFV-based handover management approach for ultradense 5G mobile networks." International Journal of Communication Systems 32.17 (2019): 15 pages.
Huang, Min, and Xu Zhang. "Distributed MAC Scheduling Scheme for C-RAN with Non-Ideal Fronthaul in 5G Networks." 2017 IEEE Wireless Communications and Networking Conference (WCNC). IEEE, 2017; 6 pages.
International Searching Authority; International Search Report and Written Opinion; International Application No. PCT/US2021/073111; dated Apr. 21, 2022; 9 pgs.
Karimi, A., Pedersen, K.I. and Mogensen, P., Aug. 2019. 5G URLLC performance analysis of dynamic-point selection multi-user resource allocation. In 2019 16th International Symposium on Wireless Communication Systems (ISWCS) (pp. 379-383). IEEE.
Karimi, Ali, et al. "5G centralized multi-cell scheduling for URLLC: Algorithms and system-level performance." IEEE Access 6 (2018): 72253-72262.
Karimi, Ali, et al. "Centralized joint cell selection and scheduling for improved URLLC performance." 2018 IEEE 29th Annual International Symposium on Personal, Indoor and Mobile Radio Communications (PIMRC). IEEE, 2018; 6 pages.
Karimidehkordi, Ali. "Multi-Service Radio Resource Management for 5G Networks." (2019).
Morancho et al. Coordination strategies for interference management in mimo dense cellular networks. Diss. Universitat Politecnica de Catalunya, 2017; 240 pgs.
Mwakwata, Collins Burton, et al. "Cooperative interference avoidance scheduler for radio resource management in nb-iot systems." 2020 European Conference on Networks and Communications (EuCNC). IEEE, 2020; pp. 154-159.
Ngo, Hien Quoc, et al. "Cell-free massive MIMO versus small cells." IEEE Transactions on Wireless Communications 16.3 (2017): 1834-1850.
Niu, Binglai, et al. "A dynamic resource sharing mechanism for cloud radio access networks." IEEE Transactions on Wireless Communications 15.12 (2016): 8325-8338.
Niu, Jinping, et al. "Multi-cell cooperative scheduling for uplink SC-FDMA systems." 2013 IEEE 24th Annual International Symposium on Personal, Indoor, and Mobile Radio Communications (PIMRC). IEEE, 2013; pp. 1582-1586.
O-RAN Alliance; O-RAN Working Group 1 Slicing Architecture; O-RAN.WG1.Slicing-Architecture-v03.00, Technical Specification, Nov. 2020; pp. 1-36 and figures A.1.2-1, 3.2.3-1.
O-RAN Alliance; O-RAN Working Group 1, Study on O-RAN Slicing; O-RAN.WG1.Study-on-O-RAN-Slicing-v02.00; Technical Specification; Apr. 2020; pp. 1-28.
Rodoshi, Rehenuma Tasnim, Taewoon Kim, and Wooyeol Choi. "Resource management in cloud radio access network: Conventional and new approaches." Sensors 20.9 (2020): 2708; 32 pages.
Samsung; Network Slicing; Technical White Paper; Apr. 22, 2020; pp. 1-21.
Singh et al. "A survey on resource scheduling in cloud computing: Issues and challenges." Journal of grid computing 14.2 (2016): 217-264.
Umesh et al.; Overview of O-RAN Fronthaul Specifications; NTT DOCOMO Technical Journal; Jul. 2019; pp. 46-59; vol. 21, No. 1.
Wei et al. "Multi-Cell Cooperative Scheduling for Network Utility Maximization With User Equipment Side Interference Cancellation." IEEE Transactions on Wireless Communications 17.1 (2017): 619-635.
Xu, Xiaodong, et al. A frameless network architecture for the way forward of C-RAN. China Communications 13.6 (2016): 154-166.
Xu, XiaoDong, et al. Resource pooling for frameless network architecture with adaptive resource allocation. Science China Information Sciences 56.2 (2013): 1-12.
Xu, Xiaodong, et al. SDN based next generation mobile network with service slicing and trials. China Communications 11.2 (2014): 65-77.
Yang, Mao, et al. "OpenRAN: a software-defined ran architecture via virtualization." ACM SIGCOMM computer communication review 43.4 (2013): 549-550.
International Searching Authority; International Search Repot and Written Opinion; International Application No. PCT/US2023/060952; dated May 10, 2023; 14 pgs.

\* cited by examiner

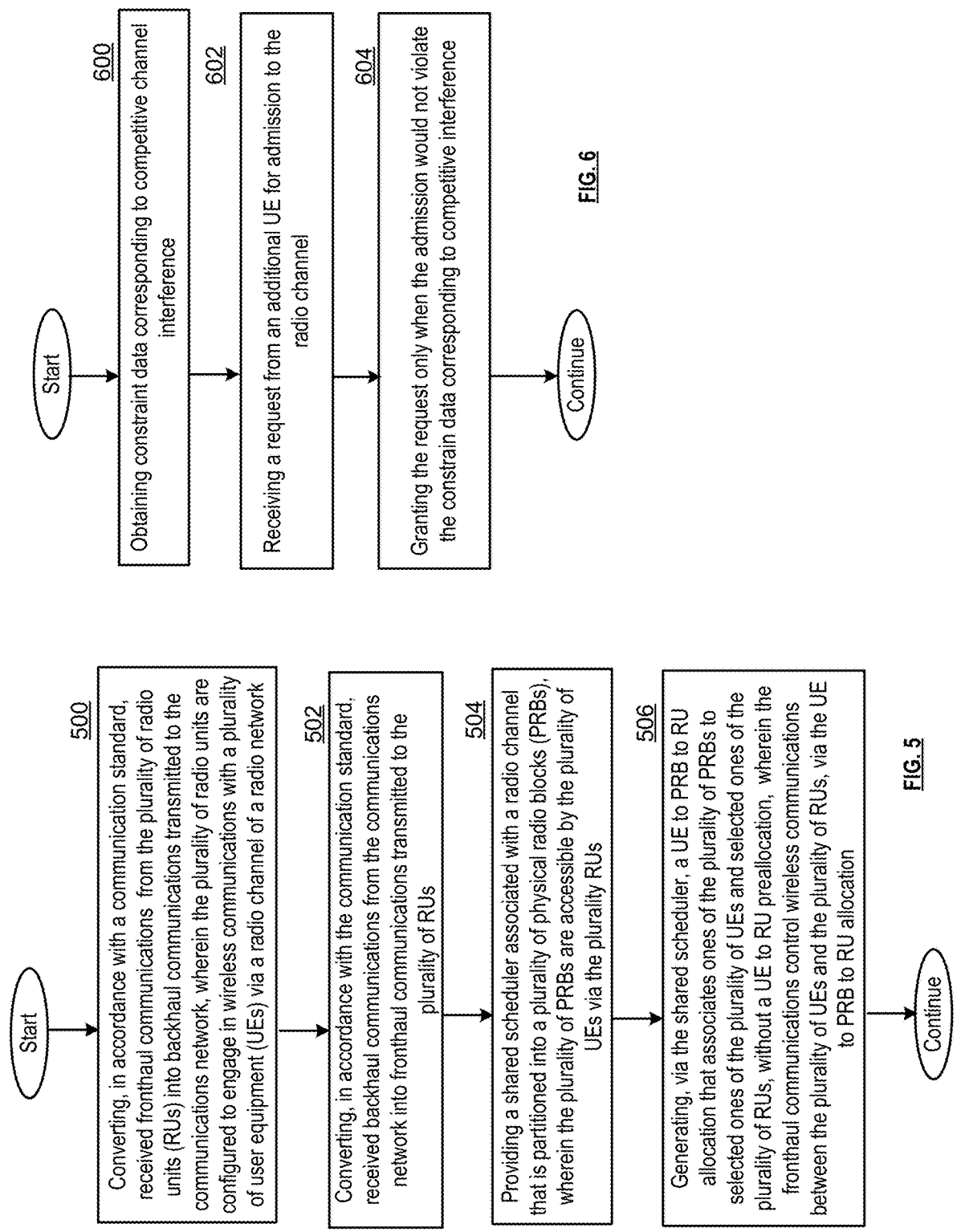

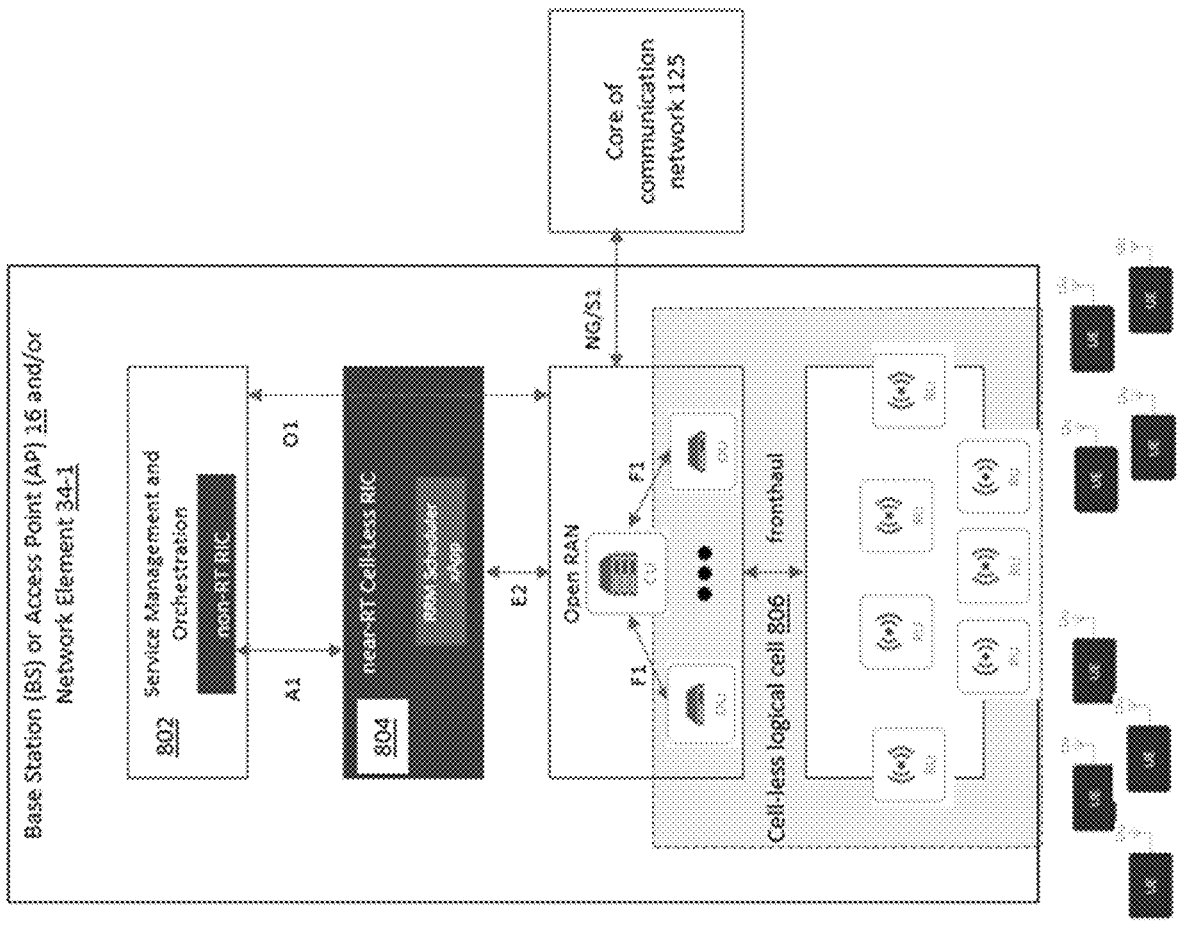

COOPERATIVE RADIO RESOURCE SCHEDULING IN A WIRELESS COMMUNICATION NETWORK AND METHODS FOR USE THEREWITH

CROSS REFERENCE TO RELATED APPLICATIONS

The present U.S. Utility Patent Application claims priority pursuant to 35 U.S.C. § 119(e) to U.S. Provisional Application No. 63/131,607, entitled "COOPERATIVE RADIO RESOURCE SCHEDULING IN A WIRELESS COMMUNICATION NETWORK AND METHODS FOR USE THEREWITH", filed Dec. 29, 2020, U.S. Provisional Application No. 63/213,496, entitled "OPEN CELL-LESS RAN PRINCIPLES, TIME TO BE ENABLED WITH O-RAN ARCHITECTURE (FIRING ON THE OPEN COMMUNICATION, CELL-LESS AND OPEN RAN COMBINATION)", filed Jun. 22, 2021, U.S. Provisional Application No. 63/217,508, entitled "METHOD AND SOLUTION FOR CELL-LESS IMPLEMENTATION", filed Jul. 1, 2021, U.S. Provisional Application No. 63/260,009, entitled "COOPERATIVE RADIO RESOURCE SCHEDULING IN A WIRELESS COMMUNICATION NETWORK AND METHODS FOR USE THEREWITH", filed Aug. 6, 2021, and U.S. Provisional Application No. 63/264,472, entitled "CELL-FREE SCHEDULER ALGORITHM", filed Nov. 23, 2021, all of which are hereby incorporated herein by reference in their entirety and made part of the present U.S. Utility Patent Application for all purposes.

FIELD OF THE DISCLOSURE

The subject disclosure relates to control of wireless communication networks.

BRIEF DESCRIPTION OF THE DRAWINGS

Reference will now be made to the accompanying drawings, which are not necessarily drawn to scale, and wherein:

FIG. 5 illustrates a flow diagram of an example, non-limiting example of a method in accordance with various aspects described herein.

FIG. 6 illustrates a flow diagram of an example, non-limiting example of a method in accordance with various aspects described herein.

FIG. 8A illustrates a schematic block diagram showing components of an example radio network in accordance with various aspects described herein.

DETAILED DESCRIPTION

Figure 1:
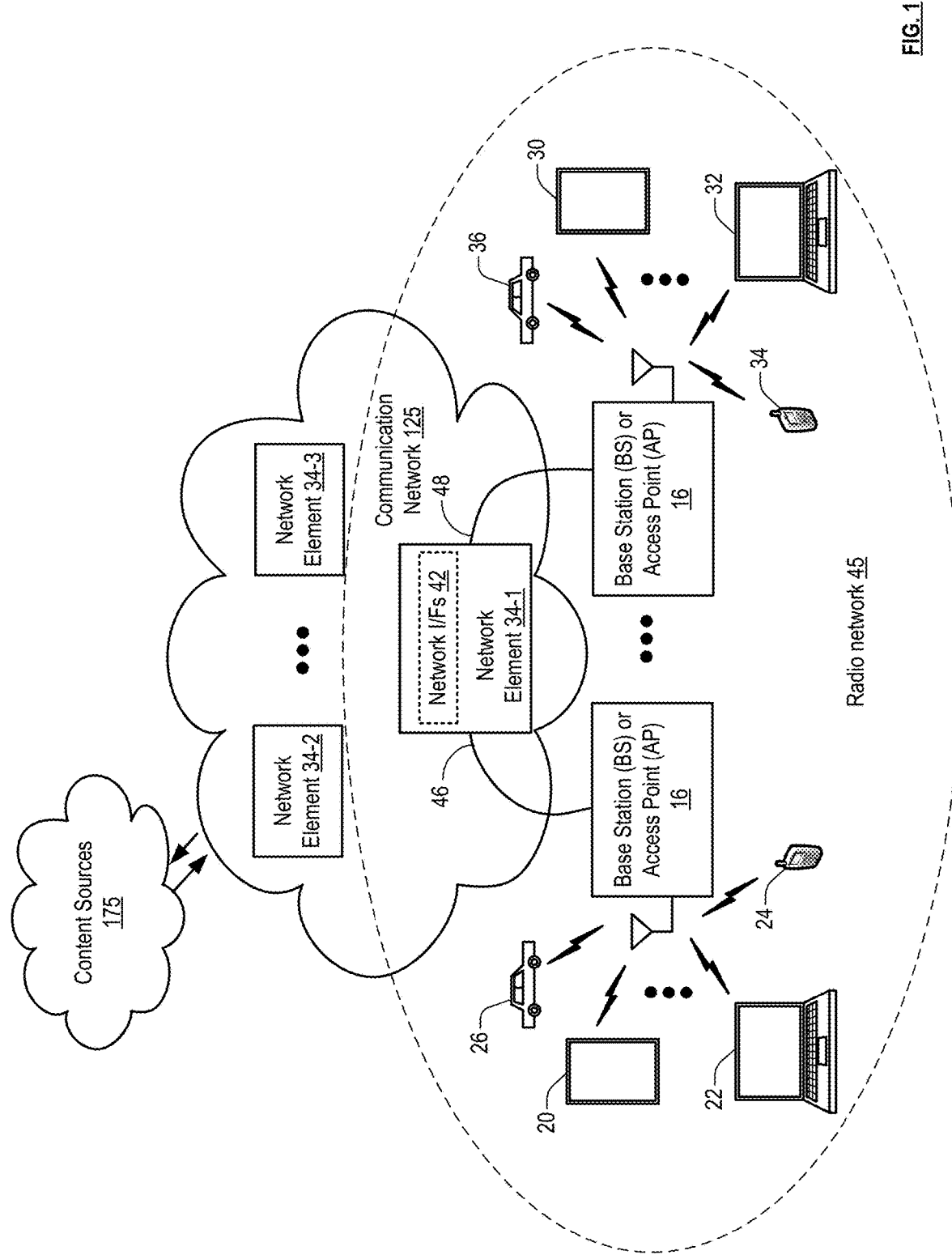
FIG. 1 is a schematic/block diagram illustrating an example, non-limiting example of a communications network in accordance with various aspects described herein.

One or more examples are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular networked environment or standard).

Referring now to FIG. 1, a schematic/block diagram is shown illustrating an example, non-limiting example of a communications network 125, such as a core communications network or other wide area network in accordance with various aspects described herein. In particular, the communications network 125 includes a plurality of network elements 34, such as network elements 34-1, 34-2 and 34-3 that are shown.

In various examples, the network elements 34 are interconnected via transport links that can be wired, optical and/or wireless links that, for example, support encapsulated and encrypted transport. The network elements 34 can be implemented, for example, with the use of radio access network (RAN) controllers, RAN intelligent controllers (RIC) either non-real time, near real time or real time, programmable switches, edge servers, soft switches, network gateways, media distribution hubs, and/or other routers, edge devices, switches or network nodes and combinations thereof that themselves can be implemented via special purpose hardware, and/or via general purpose hardware computing programmed to perform their respective functions.

The communications network 125 operates to support communications including communications via the radio network 45. In operation, the communication network 125 transports data received from content sources 175 or other data content transport clients, and/or data conveying other communications between wireless communication devices. This data can include, e.g., audio, video, graphics, text or other media, applications control information, billing information, network management information and/or other data. The core communication network 125 also operates to manage access by the wireless communication devices, provides billing and network management and supports other network functions.

The wireless communication devices include tablets 20 and 30, laptops 22 and 32, mobile phones 24 and 34, vehicles 26 and 36 and/or other fixed or mobile communication devices. The wireless communications can include signals formatted in accordance with long term evolution (LTE) 4G, 5G, other orthogonal frequency division multiple access (OFDMA) protocols and/or other wireless signaling. These wireless communications devices can be referred to as client devices or user equipment (UEs), regardless of the particular standard used to communicate with these particular devices.

The wireless communication devices communicate with base station or access points 16 to receive services from the communication network 125. Typically, base stations are used for cellular telephone systems and like-type systems, while access points are typically used for in-home or in-building wireless networks. For direct connections (i.e., point-to-point communications), wireless communication devices communicate directly with the BS or AP 16 via an allocated channel, time slot and/or other physical resource block (PRB) of a radio channel serviced by a plurality of radio units (RUs) that operate in conjunction with baseband processing to convert communications from the communications network 125 into wireless communications of the radio network 45 and vice versa. Regardless of the particular type of communication system, each wireless communication device also includes, or is coupled to, a corresponding radio configured for wireless communications via the radio network 45.

In the example shown, the network element 34-1 includes an edge server, radio access network intelligent controller and/or other network element or elements having a plurality of network interfaces (I/Fs) 42. The plurality of network interfaces (I/Fs) 42 can include a wide area network interface for operating over one or more backhaul links with other network elements 34 operating to support data transport. In addition, the network interfaces (I/Fs) 42 can support communications with other network elements 34 operating other portions of the radio network 45. The plurality of network interfaces 42 can further support a plurality of other links 46 and 48, for upstream and downstream communication with a plurality of wireless communications devices over the radio network 45 via base station (BS) or access points (AP) 16. For example, the network interfaces 42 can include a core network interface configured to communicate network communications with one or more network elements 34 of a core communication network, and a radio network interface configured to communicate communications BS or APs 16 of the radio network 45. These interfaces 42 can operate via F1, E2, evolved packet core (EPC), next generation core (NGC), 5G core or via another network protocol or standard. The network element 34-1 can also include a cooperative radio resource manager or other radio resource manager that operates to support resource management of the radio network 45 including load control and power control, and/or admission control, packet scheduling, hand-over control, and/or other user plane and control plane functions of a radio network controller/radio access network intelligent controller, etc. In addition, the network element 34-1 and BS or AP 16 can be implemented in conjunction with an open radio access network (O-RAN) or other standard that is based on interoperability and standardization of RAN elements and includes a unified interconnection standard for white-box hardware and open source software elements from different vendors to provide an architecture that integrates a modular base station software stack on off-the-shelf hardware which allows baseband and radio unit components from discrete suppliers to operate seamlessly together. For example, the network element 34-1 can include a packet processing function (PPF) which contains user-plane functions that are asynchronous to the Hybrid Automatic Repeat Request (HARD) loop, and includes the Packet Data Convergence Protocol (PDCP) layer—such as encryption—and the multipath handling function for the dual connectivity anchor point and data scheduling and/or a radio control function (RCF) that handles load sharing among system areas and different radio technologies, as well as the use of policies to control the schedulers in the RPFs and PPFs. At the user and bearer level, the RCF can, for example, operate to negotiate QoS and other policies with other domains and is responsible for the associated service level agreement (SLA) enforcement in the RAN and/or to control the overall RAN performance relative to the service requirement, creates and manages analytics data, and the RAN self-organizing network (SON) functions.

While the BS or APs 16 are show schematically as if having a single antenna, the BS or APs 16 each include a plurality of RUs (each with one or more antennas) that are supported by baseband processing via a combination of distributed units (DU) and centralized units (CU). In various examples, CUs, DUs and RUs communicate control plane and user plane signaling from the UEs to the core network. The CUs/DUs/RUs operate in conjunction with a radio access network protocol stack that can include a physical (PHY) layer, media access control (MAC) layer, radio link control (RLC) layer and one or more upper layers such as a Packet Data Convergence Protocol (PDCP) layer and a service data adaptation protocol (SDAP) layer.

The network element 34-1 and BS or AP 16 can cooperate and operate in an architecture where the baseband processing via the DU/CU combination supports a plurality of RUs with, for example, multiple DUs attaching to a single CU and/or multiple RUs attaching to single DU. In particular, a shared scheduler is implemented via or in conjunction with one or more DUs/CUs in the BS or AP 16 or the network element 34-1 to allocate the PRBs of a radio channel among the plurality of RUs and the UEs they service. In various examples, the DUs and CUs can be collocated—but they do not have to be. The shared scheduler can be located in a place where it has "fast access" to measurements from the underlying MACs of the baseband processing (e.g., for 7 RUs under single DU there will be 7 MAC instances) and is capable of responding to channel changes "fast enough" to allocate resources per TTI based on the wide view over all of the "aggregated MACs" of the RUs. Base station elements, especially the DUs and CUs can be collocated in a BS or AP 16 with multiple RUs. Alternatively, the CU alone or the CUs and DUs can be implemented in network element 34-1. In this case, element 34-1 can include a combination of 1:N DUs and/or 1 or more CUs with, for example, a single DU aggregating multiple RUs and/or a single CU aggregating multiple DUs.

Further details regarding the operation of the BS or AP 16, including several optional functions and features, will be discussed in conjunction with the figures that follow.

Figure 2:
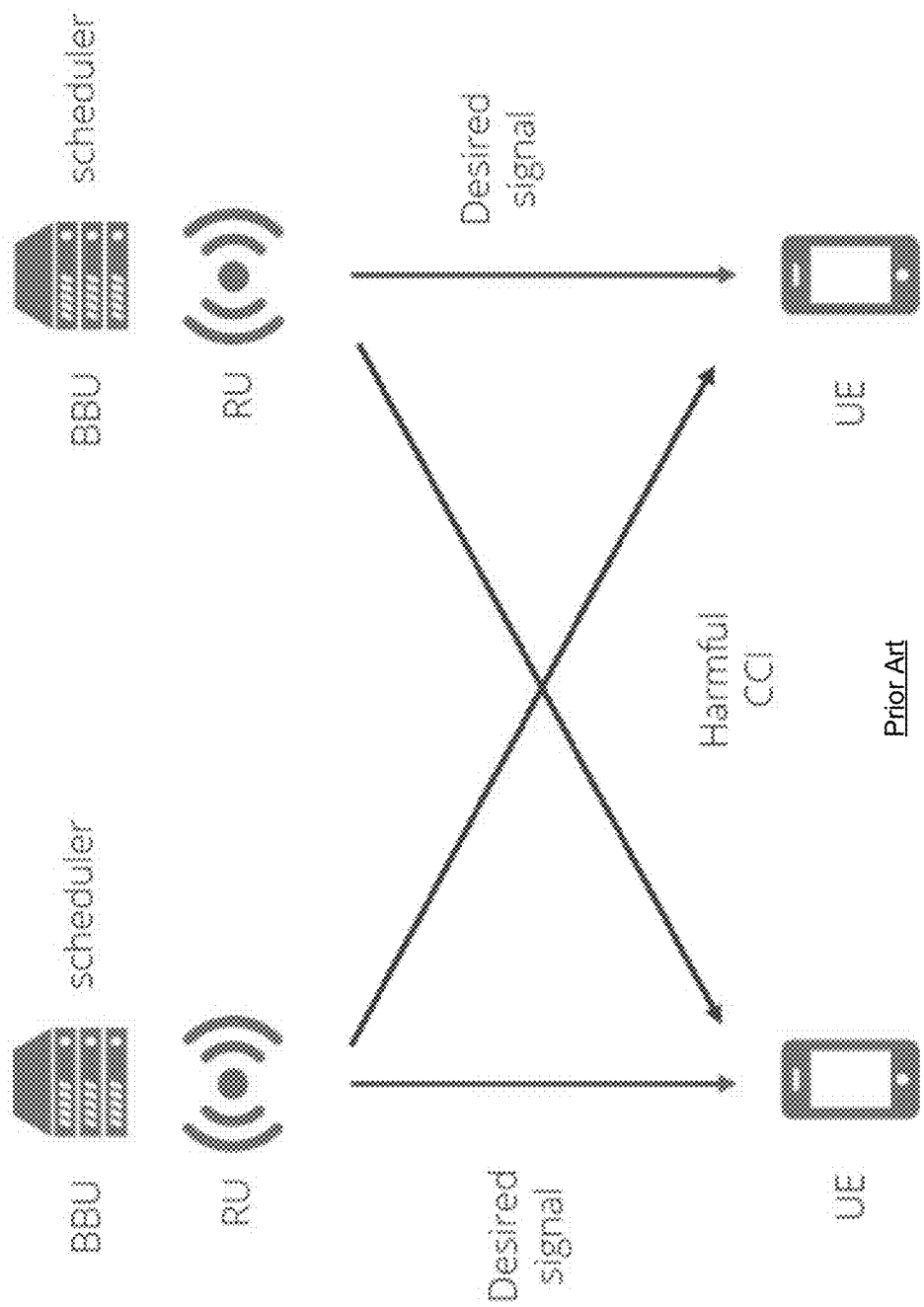
FIG. 2 is a pictorial/block diagram illustrating an example, non-limiting example of a radio network in accordance with various aspects described herein.

FIG. 2 is a pictorial/block diagram illustrating an example, non-limiting example of a radio network in accordance with various aspects described herein. In particular, a prior art base station configuration is shown for a radio access network (RAN) consisting of several base stations (BS), such as AP or BS 16. Each BS consists of a dedicated radio unit (RU) and an associated baseband unit (BBU). The role of RU is to convert analog radio signals into digital signals (e.g. complex numbers) or bits and vice versa. The role of BBU is to process the digital signals for the transmission of corresponding data via the communications network, convert the data from the communications network into the digital signals transmitted to the RUs, and otherwise realize the BS functionality as described in the standards (either 3GPP or IEEE or any other standard including 4G, 5G, WiFi, etc.).

The BSs communicate over a radio channel of the RAN with several users (equipped with UEs). The radio channel can be arranged in several ways. For example, the arrangement boils down primarily to the creation of separable links corresponding to means of transmission with the use of available radio resources. Typical examples of radio resources (referred to as physical resource blocks (PRBs)) that are used to create means of communications via time, frequency, space and/or power. These four factors can also be used to separate transmissions from and to separate users. These resources can directly influence such system performance parameters as capacity, throughput, reliability, energy consumption, and packed latency. Only in rare cases of communications systems, radio resources are available in abundance. Typically, radio resources are scarce, therefore their efficient management is desirable.

The functionality of a BS that is responsible for real-time allocation of radio resources can be referred to as a scheduler. In typical realizations of 4G, 5G but also WiFi, the scheduler is part of Medium Access Control (MAC) functionality residing on BBU associated 1:1 with a given RU. For example, in OFDMA-based systems (such as 4G LTE, 5G NR and WiFi 6) the scheduler allocates time and frequency resources, particular examples of PRBs, to users admitted to being served by a given RU/BBU. Thus, for a given RU, a scheduler residing on the associated BBU, decides on per TTI (transmission time interval) basis about which UE gets which PRBs. For multiple BSs and hence RUs, each of them has an independent scheduler.

The above situation has the following characteristics:
- UEs are pre-allocated to RUs based on some other criterion.
- The scheduler problem is binary (0,1) and two-dimensional (UE-PRB association)

In a situation of full frequency reuse (all BSs in the area are using the same carried frequency and the same channel bandwidth) independent operation of schedulers allocating resources on each BS separately is a cause of harmful interference. It is especially evident in the dynamic behavior of real-life systems, where users come and go (e.g. attach or detach), and in addition their traffic requirements may vary. Whatever the allocation of resources in each cell (BS), the allocation will always cause change of interference conditions for all the neighboring cells, pushing them, possibly to perform reallocation of resources. Therefore, the most problematic areas with respect to low SNIR (signal-to-noise-plus-interference radio) in LTE are at the cell edges. The systems with such behavior we call competitive—as neighboring BSs compete for resources.

Figure 3:
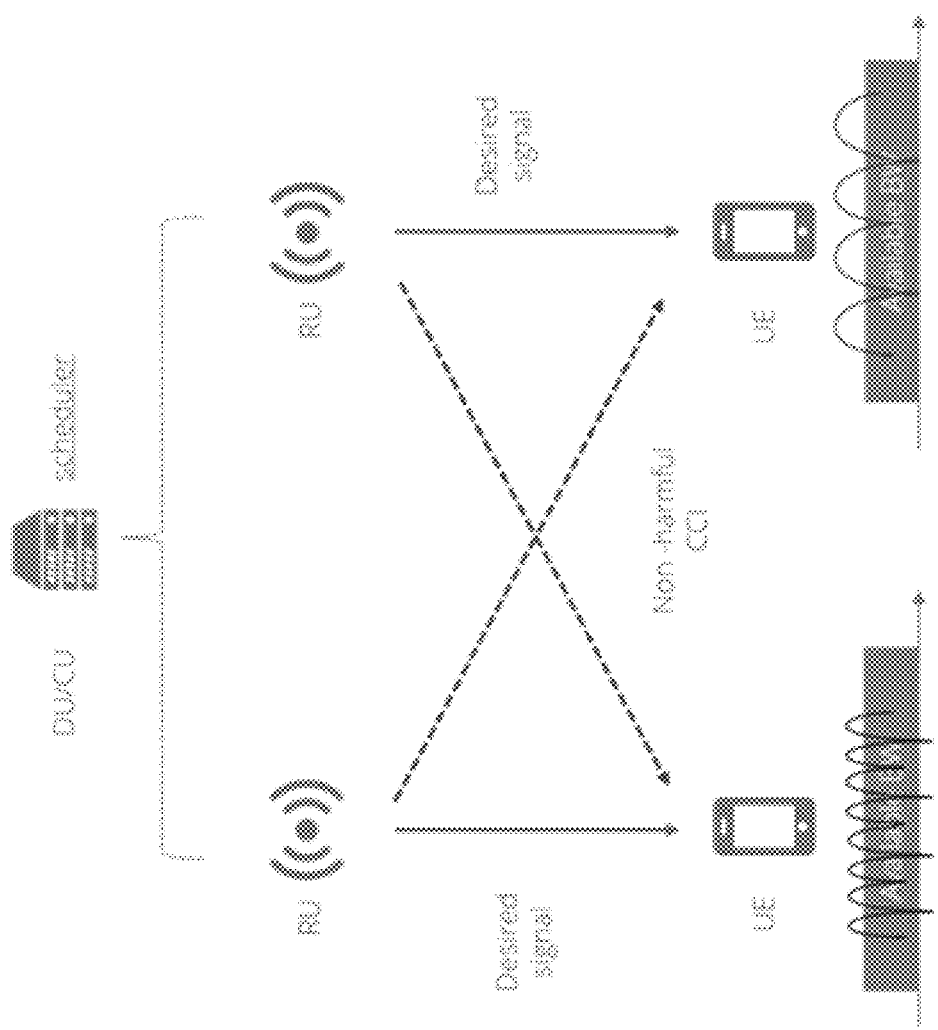
FIG. 3 is a pictorial/block diagram illustrating an example, non-limiting example of a radio network in accordance with various aspects described herein.

FIG. 3 is a pictorial/block diagram illustrating an example, non-limiting example of a radio network in accordance with various aspects described herein. In particular, a different RAN deployment is shown that utilizes an aggregation of computing resources. In particular, the 1:1 relation of BBUs with RUs of FIG. 2 has been modified by the use of distributed units (DU) or centralized units (CU). For the sake of simplicity let us focus on DU, while the same thinking can be applied to CU too. A single DU may serve more than one RU via a distributed, centralized or shared BBU serving a plurality of separate base station or access point RUs. This means that BS functionality (software) residing on DU will be realizing transmission of a number of connected RUs towards the user UEs that they serve via the radio channel of the radio network.

Figure 4:
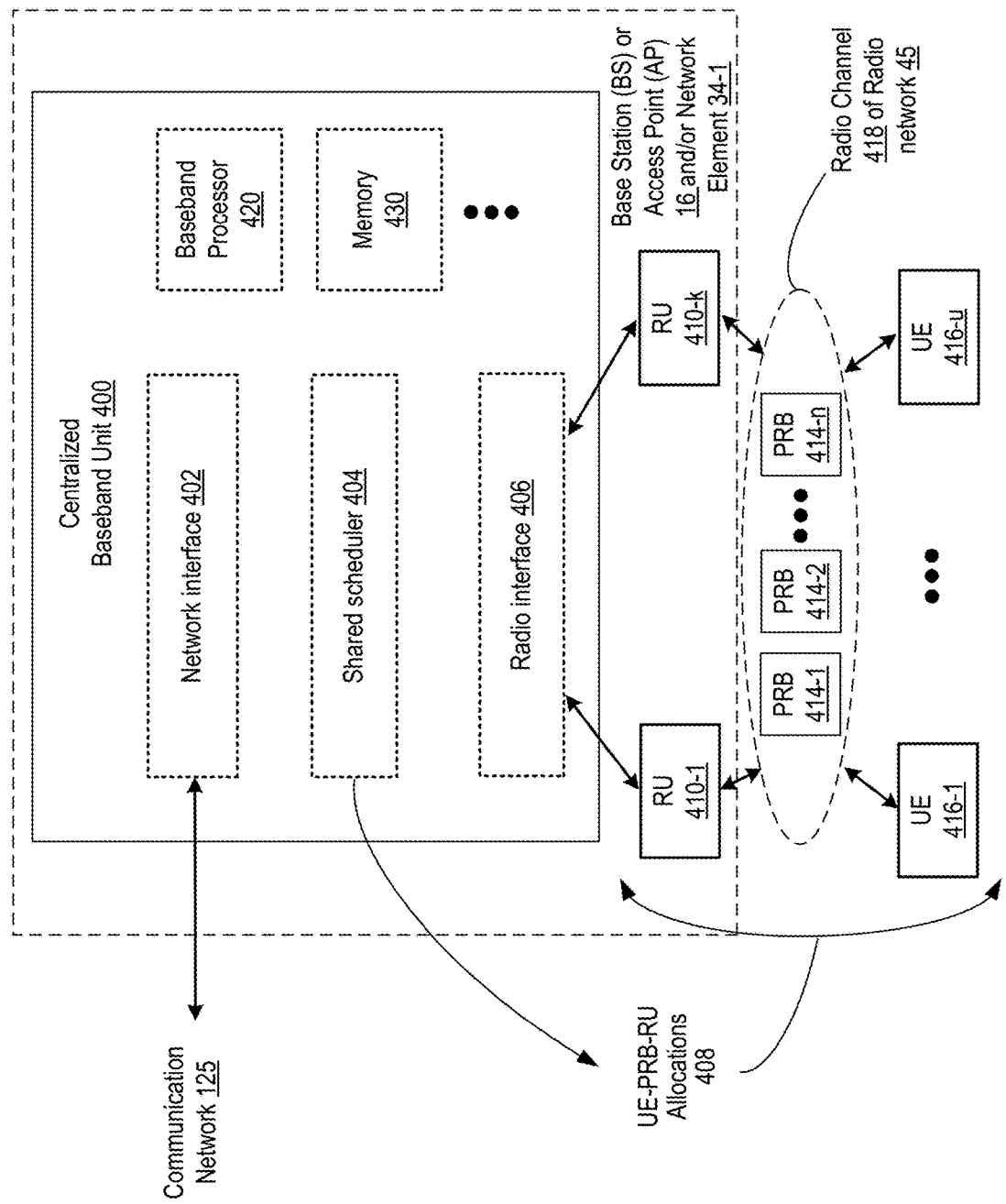
FIG. 4 is a schematic/block diagram illustrating an example, non-limiting example of a centralized baseband unit in accordance with various aspects described herein.

FIG. 4 is a schematic/block diagram illustrating an example, non-limiting example of a centralized baseband unit in accordance with various aspects described herein. In particular, a centralized baseband unit (CBU) 400 and k separate RUs (410-1 . . . 410-$k$) are shown that are configured to engage in wireless communications with a plurality of user equipment (UEs) via a radio channel 418 of the radio network 45. While the RUs (410-1 . . . 410-$k$) are implemented as part of a BS or AP 16, all or part of the CBU 400 and particularly the shared scheduler 404, can be implemented in a DU, CU that is either part of the BS or AP 16 or the network element 34-1.

Instead of realizing a scheduler on per-RU basis and controlling radio resources confined to one cell only—in this configuration the scheduler operates on per DU or CU-basis to serve a number (cluster) of RUs. As a matter of fact, such a scheduler instance (called a "shared" scheduler 404 for convenience) is associated with the same radio channel 418 of the radio network 45, partitioned into independent PRBs and accessible by UEs through a number of RUs. In various examples, the RUs individually support multi-input-multi-output (MIMO) communications between UEs through the use of multiple antennas to exploit multipath propagation, beamforming and/or spatial diversity. Such MIMO communications can include multi-user MIMO, cooperative MIMO, macrodiversity MIMO, MIMO routing, massive MIMO or other MIMO communications techniques. In this fashion, transmission and reception of PRBs between an individual RU and various UEs can include precoding, spatial multiplexing, diversity coding and/or other MIMO techniques as well as various modulation methodologies.

In the example shown, the CBU 400 includes a network interface 402, shared scheduler 404, radio interface 406, broadband processor 420 and memory 430. The network interface 402 is configured to communicate backhaul communications with one or more network elements of the communication network 125 via, for example, EPC, NGC, 5G core or other signaling. The radio interface 406 is configured to communicate fronthaul communications with the RUs 410-1 . . . 410-$k$ via, for example, fronthaul (FH), lower level split (LLS) or other signaling. The memory 430 stores operational instructions that, when executed by the baseband processor 420, cause the baseband processor to perform operations that include:

- Converting, in accordance with a communication standard, received fronthaul communications from the RUs 410-1 . . . 410-$k$ into backhaul communications transmitted to the communications network 125;
- Converting, in accordance with the communication standard, received backhaul communications from the communications network 125 into fronthaul communications transmitted to the RUs 410-1 . . . 410-$k$.
- Providing a shared scheduler 404 associated with a radio channel that is partitioned into a plurality of PRBs 414-1, 414-2, . . . 414-$n$ that are accessible by the UEs 416-1 . . . 416-$u$ via the radio units (RUs) 410-1 . . . 410-$k$.
- Generating, via the shared scheduler 404, UE to PRB to RU allocations 408 that associate the PRBs to selected ones of the plurality of UEs and selected ones of the plurality of RUs, without a UE to RU pre-allocation, wherein the fronthaul communications control wireless communications between the UEs and the RUs are facilitated, (e.g. controlled) via the UE to PRB to RU allocation 408.

The scheduler function becomes a binary 3-dimensional problem as it must associate UE-PRB-RU over a set of u different UEs, n different PRBs and k different RUs. This improves the technology of scheduling, for example, by not requiring UEs to be pre-allocated to RUs.

In various examples, the operations of the shared scheduler 404 further include:
- obtaining constraint data corresponding to competitive channel interference;
- receiving a request from an additional UE for admission to the radio channel; and granting the request only when the admission would not violate the constraint data corresponding to competitive interference.

In this fashion, UEs are admitted to the system as long as serving them does not violate the transmissions towards the other UEs. Therefore, the scheme can be classed as "cooperative". This approach further improves the technology of BSs and APs since interference that was harmful in competitive systems—becomes harmless in this cooperative system.

In addition to the above, we observe that for many environments the wireless channel will be frequency selective. This is typically a problem as the PRBs vary significantly in quality. This phenomenon can be exploited via multi-user diversity, and taking the quality of an x-th of the n PRBs (e.g., expressed in various ways, such as received power, SNIR, etc, together denoted as CSI) as perceived by the y-th of the u UEs and z-th of the k RUs, in the process of associating UE-PRB-RU. In various examples, the operations of the shared scheduler 404 further include obtaining channel state information (CSI) corresponding to each of the plurality of PRBs in combinations with ones of the plurality of UEs with ones of the plurality of RUs—wherein the shared scheduler 408 generates the UE to PRB to RU allocation based on the CSI corresponding to each of the plurality of PRBs in combinations with ones of the plurality of UEs with ones of the plurality of RUs. Hence the input to the scheduler is CSI over combinations of differing x,y,z (e.g. CSI x,y,z) and the output can be expressed as a 3-dimensional array consisting of {0,1} indicating if there is an association of UE-PRB-RU {1} or not {0}.

FIG. 5 illustrates a flow diagram of an example, non-limiting example of a method in accordance with various aspects described herein. In particular, a method is presented for use in conjunction with one or more functions and features described previously herein. Step 500 includes converting, in accordance with a communication standard, received fronthaul communications from a plurality of radio units (RUs) into backhaul communications transmitted to a communications network, wherein the plurality of radio units is configured to engage in wireless communications with a plurality of user equipment (UEs) via a radio channel of a radio network. Step 502 includes converting, in accordance with the communication standard, received backhaul communications from the communications network into fronthaul communications transmitted to the plurality of RUs. Step 504 includes providing a shared scheduler associated with a radio channel that is partitioned into a plurality of physical radio blocks (PRBs), wherein the plurality of PRBs is accessible by the plurality of user equipment (UEs) via the RUs. Step 506 includes generating, via the shared scheduler, a UE to PRB to RU allocation that associates ones of the plurality of PRBs to selected ones of the plurality of UEs and selected ones of the plurality of RUs, without a UE to RU pre-allocation, wherein the fronthaul communications control wireless communications between the plurality of UEs and the plurality of RUs, via the UE to PRB to RU allocation.

In various examples, the shared scheduler is implemented in accordance with a cell-less open radio access network (O-RAN) architecture. The cell-less O-RAN architecture can operate via a cell-less establishment procedure to associate ones of the plurality of UEs with the radio network. The shared scheduler can include a media access control (MAC) scheduler shared between a plurality of physical (PHY) layers of a single distributed unit (DU) of the radio network. The shared scheduler can further include a RAN intelligent controller (RIC) that performs the UE to RU portion of the UE to PRB to RU allocation and wherein the MAC scheduler performs the UE to PRB portion of the UE to PRB to RU allocation. The shared scheduler can include a media access control (MAC) scheduler shared between a plurality of physical (PHY) layers and a plurality of MAC layers of a single distributed unit (DU) of the radio network or a media access control (MAC) scheduler shared between a plurality of media access control MAC layers of a plurality of distributed units (DUs) of the radio network. The shared scheduler can operate via a first procedure configured to perform the UE to RU portion of the UE to PRB to RU allocation and a second procedure configured to perform the UE to PRB portion of the UE to PRB to RU allocation.

FIG. 6 illustrates a flow diagram of an example, non-limiting example of a method in accordance with various aspects described herein. In particular, a method is presented for use in conjunction with one or more functions and features described previously herein. Step 600 includes obtaining constraint data corresponding to competitive channel interference. Step 602 includes receiving a request from an additional UE for admission to the radio channel. Step 606 includes granting the request only when the admission would not violate the constraint data corresponding to competitive interference.

Figure 7:
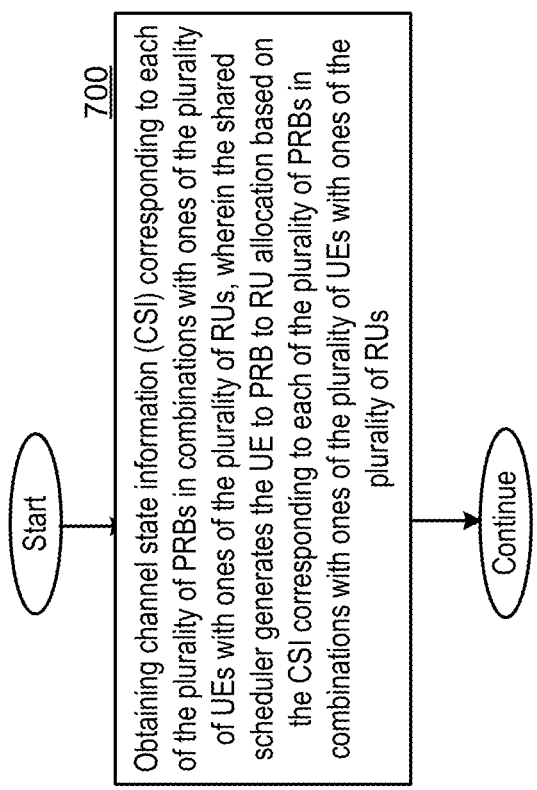
FIG. 7 illustrates a flow diagram of an example, non-limiting example of a method in accordance with various aspects described herein.

FIG. 7 illustrates a flow diagram of an example, non-limiting example of a method in accordance with various aspects described herein. In particular, a method is presented for use in conjunction with one or more functions and features described previously herein. Step 700 includes obtaining channel state information (CSI) corresponding to each of the plurality of PRBs in combinations with ones of the plurality of UEs with ones of the plurality of RUs, wherein the shared scheduler generates the UE to PRB to RU allocation based on the CSI corresponding to each of the plurality of PRBs in combinations with ones of the plurality of UEs with ones of the plurality of RUs.

Further optional functions and features for implementing a scheduler, such as a shared scheduler in a cell-less RAN, open RAN or other radio access network, are presented in conjunction with the Figures that follow.

FIG. 8A illustrates a schematic block diagram showing components of an example radio network in accordance with various aspects described herein. In particular, a new network architecture for operation in an Open RAN/O-RAN environment is presented that shall be referred to as a "cell-less" radio access network. This cell-less RAN is compatible with the 3GPP promoted RAN splitting options including the RU, DU and CU which brings more flexibility for RAN and also can be adapted to the Open architectures like an Open RAN architecture. In this configuration, a "logical" (virtual) cell is formed from a plurality of RUs in conjunction with portions of one or more DUs and CUs. For example, there may be a scheduler agent per DU with either each DU supporting multiple RUs or each DU mapping to only one RU as a terminal to pass the scheduling to the RUs included within the shared scheduler for the entire RAN.

In the example shown, a BS or AP 16 and/or network element 34-1 facilitates communications between the core of communication network 125 and a plurality of UEs. A non-RT (non-realtime) RIC 802 (or other controller) operates from the management and orchestration platform. A near-real time RIC 804 (or other controller) operates as a supervisor for the shared scheduler to control the scheduling (e.g. via a radio resource management (RRM) scheduler xApp or other shared scheduler) via scheduling agents in the open RAN CU and DUs. This cell-less RAN configuration eliminates traditional cell boundaries creating a wireless environment with a cell-less logical cell 806 where the RUs are transparent from the UE viewpoint. When an UE connects with the RAN, the connection is made via the cell-less logical cell 806 formed from the various RUs connected to the DUs. A virtual cell-less identifier (ID) can be used to identify the cell-less logical cell 806 in this regard. As the virtual cell-less network may be very large and dense from the RU point of view, the users should have less dependency to the virtual cell-less network.

In order to not be dependent on a specific RU, each UE is able to be connected to the network all the time with its identity specified by a UE-cell-less-ID that is specific to each UE—independent from the serving RU. This UE-cell-less-ID can be maintained during the time that UE is associated with the virtual cell-less network. This configuration allows the serving RU for a particular UE to be changed from any particular RU to any other RU.

In various examples, the shared scheduler is aware of the RB (e.g. PRBs) utilized by the RUs serving all the UEs—without regard to the number of DUs. If the RUs are under different DUs, then the scheduler agent at each DU supports pushing the scheduling for each of it's RUs, supervised by the near RT RIC 804.

Figure 8B:
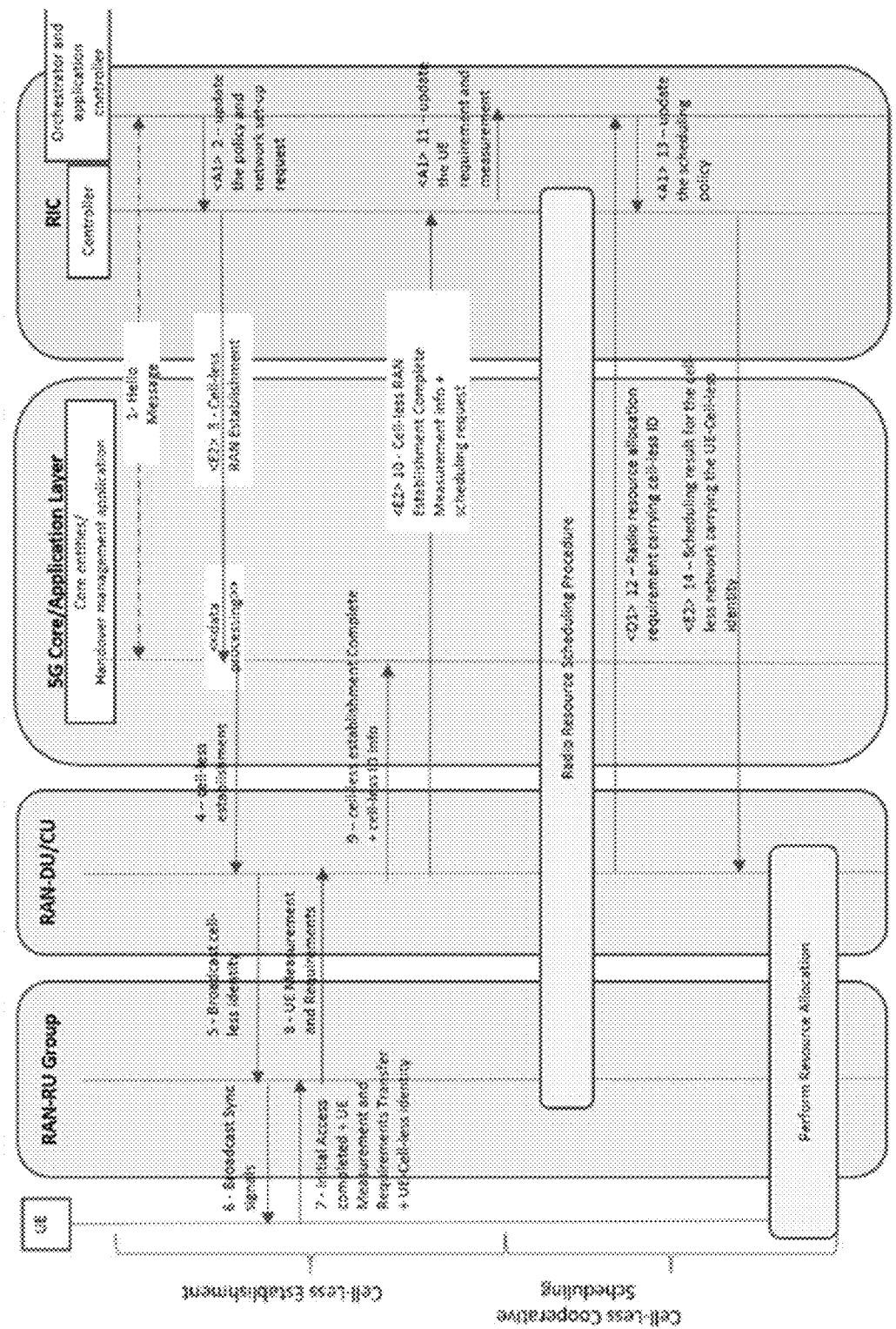
FIG. 8B illustrates a diagram showing example signal flows in accordance with various aspects described herein.

FIG. 8B illustrates a diagram showing example signal flows in accordance with various aspects described herein. In particular, processes for cell-less establishment (E/S) 820 and cell-less cooperative scheduling (C/S) 822 are presented for use in conjunction with one or more functions and features described previously herein. The procedure of cell-less establishment (E/S) 820 may happen before the example of FIG. 5 and furthermore, the cell-less cooperative scheduling (C/S) 822 can be included in step 506 of FIG. 5.

Step 1 includes a hello message of connecting the RIC controller (e.g. near RT RIC 804) with the handover management entity—e.g. 5G Core/Application layer, any other core entity or a separately designed handover manager in an application layer or covered by the controller to connect the controller with the handover manager entity. In Step 2 the available policies and network setups (e.g. at the entity responsible for the policies) are updated to the controller. Step 3 includes the cell-less establishment to all or part of the available RUs contributing to the scheduling process. The data processing happens at the entity responsible for the handover decision making which can take care of the cell-less establishment. Step 4 and 5 send the common cell establishment message to the DU/CU and the cell-less identity (e.g. the virtual cell-less identifier (ID) used to identify the cell-less logical cell 806) will be broadcast to all underlying RUs. The aim is to assign each UE to the entire network without cell-boundaries which can avoid handover signaling overheads due to the controller's top level awareness of the network information. This may be implemented such that the UE assigns its whole connection over to the entire cell-less network and not a particular RU, and will only be reassociated with the other RUs based on the scheduler's decision making. Traditional handover signaling need not occur because, from the UE point of view, the UE is assigned to the entire network of the cell-less logical cell 806. Connecting the UE to the entire cell-less network makes the reassociation faster because the UE doesn't need to have part of the signaling related to handover.

In step 6 the ID of the cell-less logical cell 806 is broadcast to the UE via sync signals and afterward, the UE is able to maintain its assignment to the entire cell-less network. The broadcast of the UE-cell-less ID may be initiated in order to keep independency of the serving RU in parallel with maintaining access to the network via the UE-cell-less ID. In step 7, the initial access is completed and the UE generates the UE-Cell-less ID and transfers it to the RU. The RU will transfer the UE measurements and requirements to the corresponding DU/CUs in step 8 to complete the admission control. The cell-less establishment complete message and the identity information are transferred to the entity responsible for handover management in step 9. Also, the same information as well as the scheduling request will be forwarded to the controller at step 10. The controller will update the status at the policy management entity in step 11. The process can continue with the cell-less cooperative scheduling procedure 922 in steps 12, 13 and 14 which results in the resource allocation to the UE.

Figure 8C:
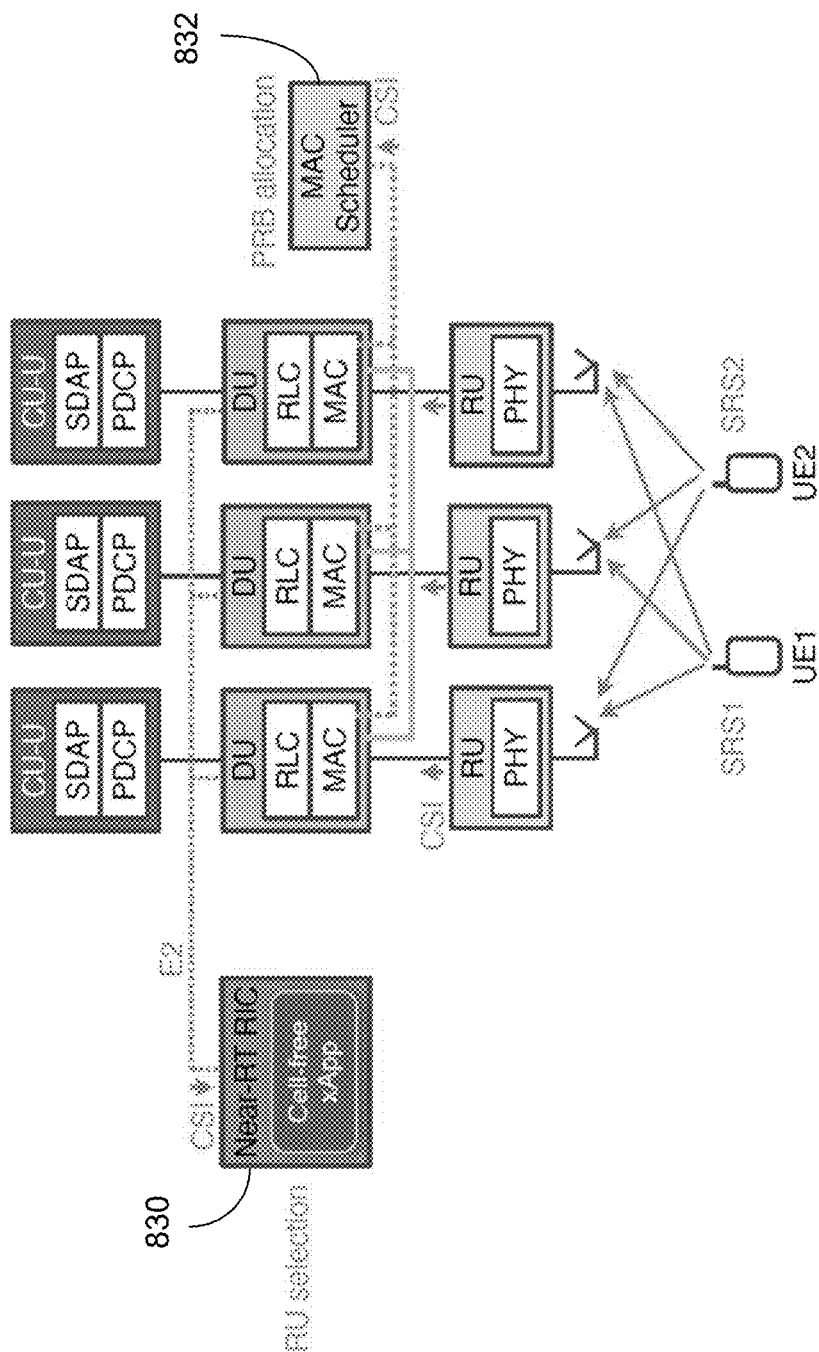
FIG. 8C illustrates a schematic block diagram showing components of an example radio network in accordance with various aspects described herein.

FIG. 8C illustrates a schematic block diagram showing components of an example radio network in accordance with various aspects described herein. In this example, the operation of the shared scheduler, such as shared scheduler 404 is divided between a near-RT RIC 830 that operates via a cell-free xApp that performs RU selection and a MAC scheduler 832 shared between three separate DUs, each having a corresponding RU that operates to perform PRB allocation.

In operation, a group of RUs is synchronized and referred to as an RU cluster. The UEs are configured to transmit orthogonal (e.g. in the time domain, the frequency domain or in a code domain), the sounding reference signals (SRSs). The RUs simultaneously or contemporaneously measure the received UL signal power per PRB on the SRS. CSI measurements are sent to the DU and forwarded to the MAC scheduler 832 and near-RT RIC 830. The DU sends the buffer size for each UE to the near-RT RIC 830 over an E2 interface. Based on the received CSI and the buffer size, the cell-free xApp in the near-RT RIC 830 selects the serving RU for each UE and sends its decision to a RAN function scheduler of the DU. The RU is selected to optimize system throughput and/or other performance criteria. The DU requests the MAC scheduler 832 to allocate PRBs in the RU selected by the near-RT RIC 830. The MAC scheduler 832 allocates the PRBs in the RU (and other RUs in the cluster) to serve the UE and the other UEs currently being served. The PRB allocation aims to further optimize system throughput and/or other performance criteria through allocation of the "best" PRBs for each UE.

Consider the following example where the UE to PRB to RU allocation of the shared scheduler, such as shared scheduler 404, operates via a cell-free scheduler algorithm that consists of two sub-algorithms:
1. A large scale algorithm, which associates the RU with the UE. This part of the algorithm can be performed in the near-RT MC 830 (or MAC scheduler 832 in the absence of a RIC).
2. A small scale algorithm, which allocates the PRBs to the UE. This part of the algorithm can be performed in the MAC scheduler 832.

The following inputs are received by the MAC scheduler 832:
  ul_rx_power$_{UE,PRB,RU}$—a 3-dimensional matrix of UL received power measured by the RUs per PRB.
  For each RLC buffer:
    The type of the RLC buffer (DRB or SRB) and for the DBR, the resource type (GBR or non-GBR).
    The amount of bits in the RLC buffer.
The following information can be sent over the E2 interface from SD-RAN to the cell-free xApp:
  The amount of bits in the RLC buffer. IE type: INTEGER for each RLC buffer of a UE (MAC or RLC).

UL received power per PRB for each UE (MAC). IE type: Integer per AP per PRB. The AP identified as the OCTET STRING UE specific data:
The type of the RLC buffer. IE type: ENUMERATED {DRB, SRB}.
For the "DBR", the resource type. IE type: ENUMERATED {GBR, non-GBR} (or RRC).
gbr INTEGER if resource type is GBR
UE power in W or dBm. IE type: INTEGER.

RU specific data:
$n_{PRB}$—the number of PRB at the RU which depends on the bandwidth and numerology received from SD-RAN pre RU. IE type: INTEGER.
TX_power$_{RU}$—received by SD-RAN per RU in W or dBm. IE type: INTEGER.

The following information is sent over E2 interface from cell-free xApp in the near-RT RIC 832 to SD-RAN via a RICControlRequest:
Serving RU for each UE. IE type: INTEGER.
Scheduler-control SEQUENCE (SIZE(1 . . . maxOfUE)) OF UE-scheduler-control tate variables Consider the following state variables for each UE:
TX_poower$_{RU}$—received by SD-RAN per RU.
$n_{PRB}$—the number of PRB at the RU which depends on the bandwidth and numerology received from SD-RAN pre RU.
UE power received from SD-RAN per UE.
$N_{PRB}$—thermal noise per system.

Based on the UL received power measured by the RUs per PRB estimate the 2-dimensional matrix of DL received power with the PRB granularity:

$$dl\_rx\_power_{PRB,RU} = 10^{[(TX\_power_{RU} - 10 \log_{10}(n_{PRB}) - (UE\ power - ul\_rx\_power_{PRB,RU}))/10]} [mW]$$

Average received power:

$$AVG\_dl\_rx\_power_{RU} = mean(dl\_rx\_power_{PRB,RU}),$$

average over all PRBs, which will be used for the large scale algorithm.

Amount of data in each RLC buffer received periodically (or some alternative if the data is not received).
The type of the RLC buffer (DRB or SRB) and for the DBR, the resource type (GBR or non-GBR) is provided for each UE once.
Averaging window start and amount of data sent during current averaging window per GBR bearer (supports GBR).
Assurance window start and amount of data sent during current assurance window (supports minimum throughput) per UE.
Serving RU per UE.
Carrier for the RU per PRB:

$$C_{PRB} = dl\_rx\_power_{PRB,RU}\ for\ each\ RU\ serving\ a\ UE$$

Interference for the AP per PRB:

$$I_{PRB} = sum(dl\_rx\_power_{PRB,RU})\ for\ all\ RUs\ except\ the\ serving\ RU.$$

Full load SINR, which is the hypothetical SINR, which would be measured by the UE if all RUs would transmit at maximum on all resource blocks:

$$SINR_{PRB} = C_{PRB}/(I_{PRB} + N_{PRB})$$

Average full load SINR:

$$AVG\_SINR = mean(SINR_{PRB})\ for\ all\ PRBs\ (or\ RBG)$$

Consider the following control parameters:
Averaging window: the averaging window duration for GBR QoS flows. Default value: 2000 ms (3GPP 23.501 5.7.4).
Assurance window: the time window for minimum UE throughput assurance. Default value 300 ms.
Minimum throughput: the minimum UE throughput, which is important for UE in poor radio conditions. Default value: 100 kbps.
Smoothing factor: the smoothing parameter for measurements averaging. Default value 0.5.

The small scale algorithm can operate via the following GBR prioritization. In particular, for each GBR QoS flow the scheduler should maintain:
The start point of the "averaging window",
The number of bits sent in the averaging window.
The averaging window starts at the arrival of the first RLC packet of the GBR QoS flow and lasts for 2000 ms. After the averaging window ends another averaging window starts. Data of the specific RLC buffer is prioritized during the averaging window with the size equal to 2000 ms*GBR (kbps), i.e. 2000 ms*1000 kbps=2.000.000 bits is prioritized in each averaging window of this QoS flow.

The small scale algorithm can operate to maintain the following minimum throughput assurance. In particular, for each UE the scheduler should maintain:
The start point of the "assurance window",
The number of bits sent in the assurance window.
The assurance window starts at the arrival of the first RLC packet for the UE and lasts for 300 ms. After the assurance window ends another one starts. After the window expires the remaining minimum data for the UE is prioritized. The "remaining minimum data" is calculated as the difference between the minimum throughput and the data already sent in the assurance window, e.g. if the minimum throughput=100 kbps and the data already send 10.000 bits then the "remaining minimum data"=300 ms*100 kbps−10.000 bits=30.000−10.000=20.000 bits.

An example flow of the small scale algorithm is as follows:
I. Loop over all RUs:
1. Mark all UEs associated with this RU and having data in the DL RLC buffers as "hungry".
2. Sort the UEs by the average full load SINR starting from the lowest SINR.
3. Loop over all UEs with GBR (allocation of prioritized resources):
    a. Take the UE with the lowest (or highest) average full load SINR.
    b. For this UE, calculate the number of Resource Block Groups (RBG), which are necessary (according to the Link Adaptation) to send the min (guaranteed in the averaging window number of bits, data in the RLC buffer).
    c. Allocate the RBGs with the best full load SINR and mark them as not available.
    d. Unmark the UE as hungry if its buffer is empty.
    e. Take the UE with the next lowest average full load SINR
    f. Go to step 3b.
4. Loop over all UEs prioritized due to minimum throughput assurance:
    a. Take the UE with the lowest average full load SINR.
    b. For this UE, calculate the number of (or PRB) Resource Block Groups (RBG), which are necessary (according to the Link Adaptation) to send the (or min) max(remaining minimum data, data in the RLC buffer).
   c. Allocate the RBGs with the best full load SINR and mark them as not available.
   d. Unmark the UE as hungry if its buffer is empty.
   e. Take the UE with next lowest average full load SINR
   f. Go to step 3b.
  5. From available RBGs select one with the highest full load SINR among the UEs which are hungry.
  6. Allocate this RBG to the UE and mark this RBG as not available.
  7. Unmark UE as hungry if its buffer is empty.
  8. Go to step 5.
II. Loop over UEs (order not important)—this part is referred to as the PRB reallocation.
  1. For this UE, calculate the actual SINR for:
     each allocated PRB for this UE
     the available PRBs.
  2. Calculate the average SINR of already allocated PRBs for the UE.
  3. Find if the same number of PRBa can be given with average SINR higher by the "small scale reallocation threshold". If so then reallocate the PRBs.
  4. Go to the next UE (i.e. step 1).
  5. End the loop after no reallocation was found for all consecutive UEs.

The "small scale reallocation threshold" is a configuration parameter with default value of 1 dB.

An example flow of the large scale algorithm is as follows:
  1. Associate each UE with the RU having the strongest $AVG\_dl\_rx\_power_{RU}$: b—best, n—not the best. The $AVG\_dl\_rx\_power_{RU}$ are averaged using exponential filter with the smoothing factor:

$F_n = (1-\text{smoothing factor}) * F_{n-1} + \text{smoothing factor} * M_{n-1}$ where F is the output of the filter, M is the measurement and n is the number (time) of the measurement.
  2. Sort UEs in the ascending order by the average full load SINR AVG_SINR (we start from the UE in the worst radio conditions).
  3. Loop over the UEs:
     a. Find the next best RU based on the $AVG\_dl\_rx\_power_{RU}$.
     b. Calculate the system throughput after the UE is reallocated to the found RU. In this process run the part I of the small scale algorithm, i.e, without time consuming part II with PRB reallocations (if the algorithm performs fast enough, PRB reallocations can be added).
     c. If the system throughput is greater than current system_throughput then perform the UE reallocation.
     d. Break the loop when there is no large scale reallocation for all consecutive UEs or when the number of iteration is greater than 3× number of UEs.

Figure 8D:
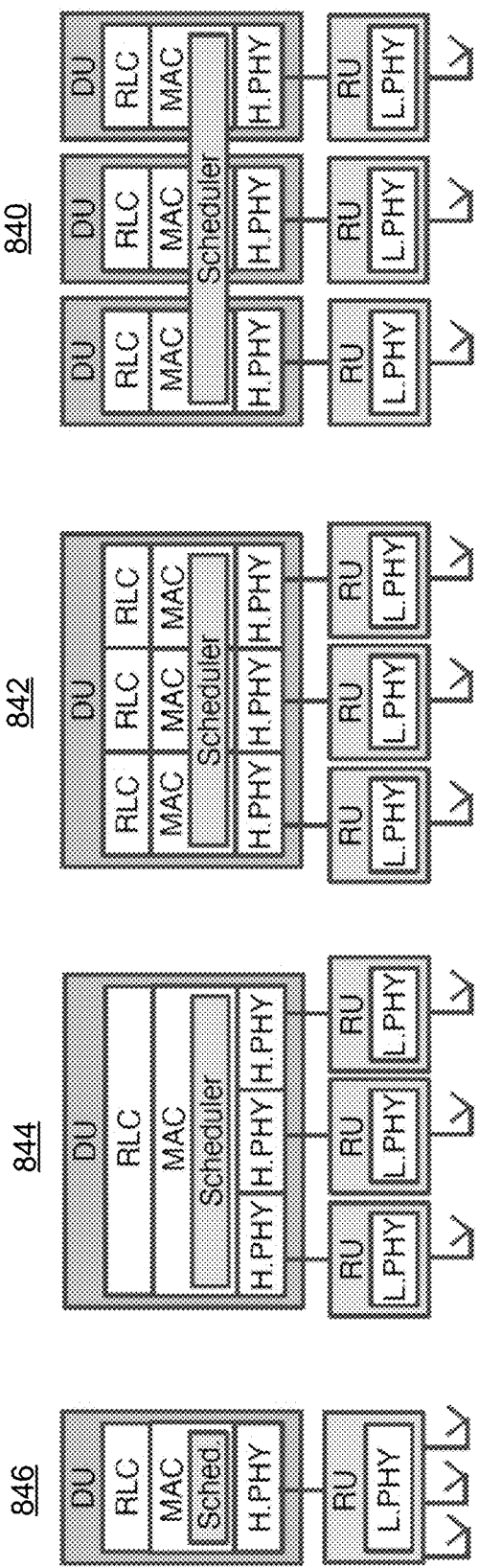
FIG. 8D illustrates various schematic block diagrams showing example configurations of a radio network in accordance with various aspects described herein.

FIG. 8D illustrates various schematic block diagrams showing example configurations of a radio network in accordance with various aspects described herein. While FIG. 8C presented a MAC scheduler that was shared by a plurality of DUs as shown further in diagram 840. Other configurations are likewise possible. In diagram 842, a MAC scheduler is shared by a single DU with a plurality of RAN protocol stacks. In diagram 844, a MAC scheduler is shared by a single DU with a single MAC layer and plurality of PHY protocol layers. In diagram 846, a MAC scheduler operates in a DU in a MIMO configuration in conjunction with a RU with multiple antennas.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks (FIG. 5, 6, Or 7) may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in the form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A centralized baseband unit comprises:
   a network interface configured to communicate backhaul communications with one or more network elements of a communication network;
   a radio interface configured to communicate fronthaul communications with a plurality of radio units;
   a baseband processor and a memory, wherein the memory stores operational instructions that, when executed by the baseband processor, cause the baseband processor to perform operations that include:
      converting, in accordance with a communication standard, received fronthaul communications from the plurality of radio units into backhaul communications transmitted to the communications network;
      converting, in accordance with the communication standard, received backhaul communications from the communications network into fronthaul communications transmitted to the plurality of radio units, wherein the plurality of radio units are configured to engage in wireless communications with a plurality of user equipment (UEs) via a radio channel of a radio network;
      providing a shared scheduler associated with a radio channel that is partitioned into a plurality of physical radio blocks (PRBs), wherein the plurality of PRBs are accessible by the plurality of UEs via the plurality radio units (RUs); and obtaining channel state information (CSI) corresponding to each of the plurality of PRBs in combinations with ones of the plurality of UEs with ones of the plurality of RUs;

generating, via the shared scheduler, an UE to PRB to RU allocation that associates ones of the plurality of PRBs to selected ones of the plurality of UEs and selected ones of the plurality of RUs, without a UE to RU pre-allocation, wherein the fronthaul communications control wireless communications between the plurality of UEs and the plurality of RUs, via the UE to PRB to RU allocation, and wherein the shared scheduler generates the UE to PRB to RU allocation based on the CSI corresponding to each of the plurality of PRBs in combinations with ones of the plurality of UEs with ones of the plurality of RUs.

2. The centralized baseband unit of claim 1, where the operations further include:

obtaining constraint data corresponding to competitive channel interference;

receiving a request from an additional UE for admission to the radio channel; and granting the request only when the admission would not violate the constrain data corresponding to competitive interference.

3. The centralized baseband unit of claim 1, wherein the shared scheduler is implemented in accordance with a cell-less open radio access network (O-RAN) architecture.

4. The centralized baseband unit of claim 3, wherein the cell-less O-RAN architecture operates via a cell-less establishment procedure to associate ones of the plurality of UEs with the radio network.

5. The centralized baseband unit of claim 3, wherein the shared scheduler includes a media access control (MAC) scheduler shared between a plurality of physical (PHY) layers of a single distributed unit (DU) of the radio network.

6. The centralized baseband unit of claim 5, wherein the shared scheduler further includes a RAN intelligent controller (RIC) that performs the UE to RU portion of the UE to PRB to RU allocation and wherein the MAC scheduler performed the UE to PRB portion of the UE to PRB to RU allocation.

7. The centralized baseband unit of claim 3, wherein the shared scheduler includes a media access control (MAC) scheduler shared between a plurality of physical (PHY) layers and a plurality of MAC layers of a single distributed unit (DU) of the radio network.

8. The centralized baseband unit of claim 3, wherein the shared scheduler includes a media access control (MAC) scheduler shared between a plurality of media access control MAC layers of a plurality of distributed units (DUs) of the radio network.

9. The centralized baseband unit of claim 1, wherein the shared scheduler wherein the shared scheduler operates via a first procedure configured to performs the UE to RU portion of the UE to PRB to RU allocation and a second procedure configured to perform the UE to PRB portion of the UE to PRB to RU allocation.

10. A method comprising:

converting, in accordance with a communication standard, received fronthaul communications from a plurality of radio units (RUs) into backhaul communications transmitted to a communications network, wherein the plurality of radio units are configured to engage in wireless communications with a plurality of user equipment (UEs) via a radio channel of a radio network;

converting, in accordance with the communication standard, received backhaul communications from the communications network into fronthaul communications transmitted to the plurality of RUs;

providing a shared scheduler associated with a radio channel that is partitioned into a plurality of physical radio blocks (PRBs), wherein the plurality of PRBs are accessible by the plurality of UEs via the RUs;

generating, via the shared scheduler, an UE to PRB to RU allocation that associates ones of the plurality of PRBs to selected ones of the plurality of UEs and selected ones of the plurality of RUs, without a UE to RU pre-allocation, wherein the fronthaul communications control wireless communications between the plurality of UEs and the plurality of RUs, via the UE to PRB to RU allocation;

obtaining constraint data corresponding to competitive channel interference;

receiving a request from an additional UE for admission to the radio channel; and granting the request only when the admission would not violate the constrain data corresponding to competitive interference.

11. The method of claim 10, further comprising:

obtaining channel state information (CSI) corresponding to each of the plurality of PRBs in combinations with ones of the plurality of UEs with ones of the plurality of RUs;

wherein the shared scheduler generates the UE to PRB to RU allocation based on the CSI corresponding to each of the plurality of PRBs in combinations with ones of the plurality of UEs with ones of the plurality of RUs.

12. The method of claim 10, wherein the shared scheduler is implemented in accordance with a cell-less open radio access network (O-RAN) architecture.

13. The method of claim 12, wherein the cell-less O-RAN architecture operates via a cell-less establishment procedure to associate ones of the plurality of UEs with the radio network.

14. The method of claim 12, wherein the shared scheduler includes a media access control (MAC) scheduler shared between a plurality of physical (PHY) layers of a single distributed unit (DU) of the radio network.

15. The method of claim 14, wherein the shared scheduler further includes a RAN intelligent controller (MC) that performs the UE to RU portion of the UE to PRB to RU allocation and wherein the MAC scheduler performed the UE to PRB portion of the UE to PRB to RU allocation.

16. The method of claim 12, wherein the shared scheduler includes a media access control (MAC) scheduler shared between a plurality of physical (PHY) layers and a plurality of MAC layers of a single distributed unit (DU) of the radio network.

17. The method of claim 12, wherein the shared scheduler includes a media access control (MAC) scheduler shared between a plurality of media access control MAC layers of a plurality of distributed units (DUs) of the radio network.

18. The method of claim 10, wherein the shared scheduler operates via a first procedure configured to performs the UE to RU portion of the UE to PRB to RU allocation and a second procedure configured to perform the UE to PRB portion of the UE to PRB to RU allocation.

* * * * *